Figure 1:
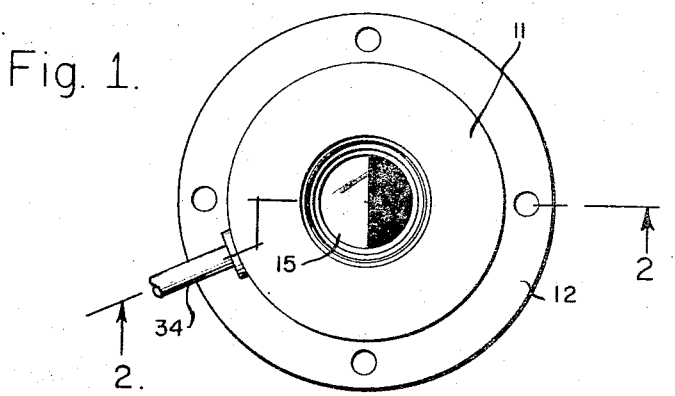

Oct. 17, 1967

R. P. CLIFFORD 3,348,047

DIFFERENTIAL RADIOMETER HAVING HIGH
AND LOW ABSORPTION CHARACTERISTICS
Filed July 7, 1964

Richard P. Clifford,
INVENTOR.

BY.

*E. Hayward Marshall*

AGENT.

United States Patent Office 3,348,047
Patented Oct. 17, 1967

3,348,047
DIFFERENTIAL RADIOMETER HAVING HIGH
AND LOW ABSORPTION CHARACTERISTICS
Richard P. Clifford, Tarzana, Calif., assignor to
TRW Inc., a corporation of Ohio
Filed July 7, 1964, Ser. No. 380,835
4 Claims. (Cl. 250—83.3)

This invention relates to a differential radiometer and more particularly to a highly stable and fast radiometer for measuring the intensity of radiation, and particularly the radiation from stimulated solar sources in space craft environment.

Numerous devices have been utilized in the past for measuring solar radiation intensity such as the Eppley 180° pryheliometer which is used as a radiation measurement standard in environmental testing. This instrument is slow to respond and temperature sensitive as well as being fragile. Black disc thermopiles are also slow to respond and are extremely sensitive to body temperature. Photo detectors such as solar cells which are frequently used for monitoring simulated solar radiation are spectrally selective and temperature sensitive.

Among other instruments which have been utilized is a circular foil radiometer, which is described by R. Gardon in The Review of Scientific Instruments, 1952, Volume 24, No. 5, on page 366. This instrument is essentially a hollow cylindrical body with thick walls having a relatively heavy mass and having a thin metallic foil stretched across one of the open ends of the body. The temperature at the center of the metal foil is compared with the body temperature, and the temperature difference between the center of the foil and the body is utilized as an output to indicate the intensity of radiation. The disadvantage of this device is that the body does not respond to the ambient temperature effects in the same time period as the thin circular foil. Hence, there is no real ambient temperature compensation. The standard circular foil radiometer assumes for its operation that the body temperature is constant or fixed. Furthermore, the circular foil radiometer can not compensate for radiative or convective coupling to a window placed in front of the sensing foil.

Briefly stated one preferred embodiment of the present invention consists essentially of a massive, hollow, cylindrical heat sink or body having two sensor half-discs or separate semi-circular sheets of thin metallic foil separated slightly at the center and attached at their circular edges to the body. The exposed surface of one-half disc is coated with a high absorptivity material, such as a coating of flat black paint and the other half disc is coated with a low absorptivity material such as smoked magnesium oxide, both of which have a substantially uniform absorptivity over a wide portion of the radiation spectrum. A quartz window placed in front of the two sensors limits the uniform spectral response to .27 to 2.7 microns, which is satisfactory for use with most solar simulation sources. The two coatings are also chosen to have substantially equal emissivities.

When radiation strikes the foil surface, heat flows radially from the center of each of the foil half-discs to the cooler edge connected to the heat sink or body. A resistive temperature gauge is attached to the center of each half disc for sensing the temperature, and the difference in temperature is measured by connecting these temperature gauges as the adjacent arms of a conventional Wheatstone bridge circuit.

Since all ambient environmental effects common to both sensors are balanced out by the differential circuit, the instrument is able to operate under a wide range of conditions without significant effect on the stability and sensitivity. The bridge unbalance, as a consequence of the temperature difference between the two half sensors, provides the output signal which is substantially linearly proportional to the incident flux.

One object of the present invention is to provide a radiometer for measuring the intensity of solar radiation which is extremely fast in its response and has a substantially uniform spectral response.

Another object of the present invention is to provide a radiometer which is rugged and is substantially insensitive to temperature variations over a wide range of temperatures and operating conditions, which have no significant effect on the stability and sensitivity.

Figure 2:
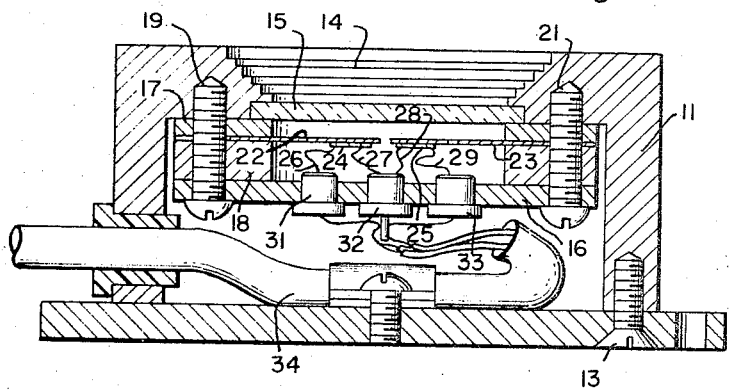

Other objects and many of the attendant advantages of the invention will be readily appreciated as the same becomes better understood by reference to the following detailed description when considered with the accompanying drawings wherein:

FIGURE 1 is a plan view of one preferred embodiment of the present invention; and FIGURE 2 is a sectional view taken on the line 2—2 of FIGURE 1.

Referring now to the drawings in detail, one preferred embodiment of the present invention is illustrated wherein a substantially cylindrical hollow body 11 is attached to a mounting plate 12 by conventional means, such as the machine screws 13. An opening 14 is formed in the upper portion of the body 11 by a plurality of stepped concentric circular recesses.

A quartz window 15 is held in a circular recess below the opening 14 by a sensor assembly consisting of the terminal plate 16 and the two disc clamps 17 and 18 which are secured to the body 11 by suitable means, such as the screws 19 and 21.

The two half-disc sensing elements 22 and 23 are clamped between the two disc clamps 17 and 18, and are preferably formed of some thin metallic foil having a high thermal conductivity, whereby the heat is transmitted or conducted radially at a very high rate to the heat sink or body 11. The surface of one half disc 22 is coated with a material having high absorptivity and high emissivity, such as flat black paint and the other half disc coated with smoked magnesium oxide which has a low absorptivity.

The temperature of the center of each half-disc is sensed by means of the resistance temperature gauges 24 and 25 which are cemented or otherwise secured to the undersurfaces of each of the half-discs 22 and 23, respectively. The difference in temperature is measured by connecting these resistive elements, as adjacent arms in a conventional Wheatstone bridge circuit, through the leads 26, 27, 28, and 29, which extend out through the Teflon bushings 31, 32, and 33 and then out through the cable 34 to the Wheatstone bridge measuring circuit (not shown), which provides an output which is linearly proportional to the incident flux on the metal foil sensing elements 22 and 23.

Operation

The exposed surface of one half-disc is coated with a high absorptivity material, while the other half-disc is coated with a low absorptivity material. The two coatings are chosen to have, in so far as possible, equal emissivities. When radiation strikes the foil surface, heat flows radially from the center of the foil half-disc to the cooler edge attached to the heat sink or body 11. The steady state difference in temperature between the center of the foil half-disc and its circular edge adjacent the body 11 is given by the relationship:

$$T_c - T_s = a\dot{q}\frac{R^2}{4ks}$$

where:

$T_c$=temperature at circular center of half-disc
$T_s$=temperature at edge or heat sink
$\alpha$=absorptivity of foil surface
$q$=incident flux
$R$=radius of half-disc
$k$=thermal conductivity of foil material
$s$=thickness of foil As a conesquence of the different absorptivities of each half-disc, each will absorb incident radiation at a different rate and each will therefore experience a different center temperature so that:

$$T_{c1} - T_s = a_1\dot{q} = \frac{R^2}{4ks}$$

$$T_{c2} - T_s = a_2\dot{q} = \frac{R^2}{4ks}$$

Since both half-discs are identical in all respects, with the exception of absorptivity, the difference in the center temperature can be expressed by $$T_{c1} - T_{c2} = (a_1 - a_2)\dot{q}\frac{R^2}{4ks}$$

For a given radiometer $(a_1 - A_2)_{R^2/4ks}$=constant $(C)$, the relation can therefore be expressed by:

$$\dot{q} = C(T_{c1} - T_{c2})$$

The temperature of the center of each of the half-discs 22 and 23 is sensed by means of the thin etched Nickel foil resistance thermometer elements 24 and 25 cemented to the rear surface of the half-disc. The difference in temperature $(T_{c1} - T_{c2})$ is measured by connecting these resistance elements as adjacent arms of a Wheatstone bridge circuit.

Since all ambient environment effects common to both half-sensors are balanced out by the differential circuit, the instrument is able to operate under a wide range of conditions without significant effect on its stability and sensitivity. The bridge unbalance as a consequence of a difference in temperature between the two half-sensors provides an output signal.

As shown by the relation $\dot{q} = C(T_{c1}-T_{c2})$ the temperature difference is linearly proportional to the incident flux. The combined thermal effects (thermal zero shift and thermal sensitivity shift) are less than 2% of the full scale sensitivity over a range of body temperatures of 380° F. (from —180° to +200° F.). A pressure decrease from atmospheric to $10^{-5}$ Torr results in a 10% increase in the instruments' sensitivity. This somewhat lower degree of pressure compensation is due to the slightly higher heat transfer of the air by conduction from the hot half-disc 22. Normally, the radiometer would be pressure or vacuum sealed, or else calibrated for use in both air and vacuum.

The time constant of the differential radiometer is given by the relationship $$\tau = \frac{C_p R^2}{4k}$$

where:

$\tau$=63% time constant
$C$=specific heat or foil material
$R$=radius heat of foil material
$\rho$=density of foil material
$k$=thermal conductivity of foil material The speed of response is governed by the thermal properties and dimensions of the half-disc material. For high speed response a metal foil with high thermal diffusivity is required. Silver foil half-discs of 0.43 in radius have time constants of 0.5 second. This is over an order of magnitude faster than thermopile radiometers or pryheliometers previously used. This speed of response makes the radiometer capable of being traversed at practical speeds of 1 inch per second.

The spectral sensitivity of the instrument is governed by the absorptivity of the material with which the exposed surfaces of the half-discs are coated. The foil half-discs 22 and 23 may be coated with dull black paint and smoked magnesium oxide respectively, both of which have uniform absorptivity over a wide portion of the radiation spectrum. A quartz window placed in front of the sensor limits the uniform spectral response to a range from .27 to 2.7 microns, which is satisfactory for use with most solar simulation sources. This invention takes advantage of the speed of response provided by the rapid dissipation of heat through a solid metallic conductor, while at the same time providing for rapid ambient effects compensation, because of the identical nature and exposure of the "hot" and "cold" sensing surfaces. In the standard circular foil radiometer the differential temperature is sensed between the instrument body case and the circular foil center.

The disadvantage there is that the body does not respond to ambient effects in the same manner or in the same time period as does the thin circular foil, hence there is no real ambient temperature compensation. The standard circular foil radiometer assumes for its operation that the body temperature is constant or fixed. Additionally, the circular foil radiometer can not compensate for radiative or conductive coupling to a window placed in front of the sensing foil, as this invention does.

While the massive cylindrical body 11 provides a heat sink which absorbs the heat flux from the thin metal sheets or half discs 22 and 23 to reduce the response time of the radiometer and also provide rugged support, the metal sheets 22 and 23 may be supported in other ways and the heat flux may be disispated by radiation or convection. For example, the metal foil sheets may be supported only by the wires connected to the resistance temperature gauges, and the heat may be dissipated by a highly emissive surface on the side to which the gauges are secured.

The half discs 22 and 23 are preferably made of thin metal sheets, such as silver foil, but other material such as plastic may be utilized, but should have a relatively high thermal conductivity and/or high emissivity.

Obviously, many other modifications and variations of the present invention may be made within the scope of the following claims.

The embodiments of the invention in which an exclusive property or privilege is claimed are defined as follows:

1. A differential radiometer comprising:
   (A) a hollow cylindrical body having an axial opening in one end thereof for admitting radiation;
   (B) a pair of thin metallic half discs positioned in said opening with their peripheral portions contacting said body, one of said half discs being coated with a material having a high absorptance and high emissivity, the other of said half discs being coated with a material having a low absorptance and high emissivity;
   (C) means for resistively sensing the temperature adjacent the center of curvature of each of said half discs;
   (D) a quartz window positioned in said opening before said half discs;
   (E) electric circuit means connected to said sensing means for providing an output signal.

2. A differential radiometer comprising:
   (A) a relatively massive hollow cylindrical body having an axial opening in one end thereof for admitting radiation;

(B) a pair of thin metallic half discs positioned in said opening with their proximate diametrical edges slighlty separated and their peripheral circular portions contacting said body,
one of said half discs being coated with a material having a high absorptance and high emissivity,
the other of said half discs being coated with a material having a low absorptance and high emissivity;
(C) means for resistively sensing the temperature adjacent the center of curvature of each of said half discs;
a window positioned in said opening before said half discs;
electric circuit means connected to said sensing means for providing an output signal—and substitute a semicolon for a period after discs.

3. A differential radiometer comprising:
(A) a relatively massive hollow cylindrical body having an axial opening in one end thereof for admitting radiation;
(B) a pair of thin metallic half discs positioned in said opening with their proximate diametrical edges slightly separated and their peripheral circular portions contacting said body,
one of said half discs being coated with a material having a high absorptance and high emissivity,
the other of said half discs being coated with a material having a low absorptance and high emissivity;
(C) means for resistively sensing the temperature adjacent the center of curvature of each of said half discs;
(D) a quartz window positioned in said opening before said half discs; and
(E) electric circuit means connected to said sensing means for providing an output signal.

4. A differential radiometer comprising:
a body having means therein for admitting radiation;
first and second sensing sheets positioned in said body adjacent each other and adapted to be exposed to radiation, said first sensing sheet having a surface with high absorptance and high emissivity to radiation, said second sheet having a surface with low absorptance and high emissivity to radiation;
means for resistively sensing the temperature of each of said sheets;
a window positioned in said body between the means for admitting radiation and said sheets; and
electric circuit means connected to said sensing means for providing an output signal.

References Cited
UNITED STATES PATENTS

| | | | |
|---|---|---|---|
| 3,010,102 | 11/1961 | Ketchledge et al. | 250—83.3 X |
| 3,054,977 | 9/1962 | Baasch | 338—18 |
| 3,069,546 | 12/1962 | Buntenbach | 250—83.3 |
| 3,179,805 | 4/1965 | Astheimer | 250—83.3 |
| 3,232,113 | 2/1966 | Malone | 73—355 |
| 3,255,632 | 6/1966 | Brooks | 73—355 |

ARCHIE R. BORCHELT, *Primary Examiner.*

RALPH G. NILSON, *Examiner.*

S. ELBAUM, *Assistant Examiner.*